(12) United States Patent
Smith et al.

(10) Patent No.: US 11,521,143 B2
(45) Date of Patent: Dec. 6, 2022

(54) SUPPLY CHAIN DISRUPTION ADVISOR

(71) Applicant: International Business Machines Corporation, Armonk, NY (US)

(72) Inventors: Galen Kilpatrick Smith, Apex, NC (US); John Dell'Arciprete, Raleigh, NC (US); Vienna C. Polanco, Poughkeepsie, NY (US); Damien G. Rubotham, Ballyjamesduff (IE)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 16/541,008

(22) Filed: Aug. 14, 2019

(65) Prior Publication Data
US 2021/0049532 A1 Feb. 18, 2021

(51) Int. Cl.
*G06Q 10/06* (2012.01)
*G06N 5/04* (2006.01)
*G06N 20/00* (2019.01)

(52) U.S. Cl.
CPC ....... *G06Q 10/06315* (2013.01); *G06N 5/047* (2013.01); *G06N 20/00* (2019.01)

(58) Field of Classification Search
CPC .......................... G06Q 10/06315; G06N 5/047
See application file for complete search history.

(56) References Cited

U.S. PATENT DOCUMENTS

| | | | |
|---|---|---|---|
| 7,389,386 B2 | 6/2008 | Crick et al. | |
| 7,499,766 B2 | 3/2009 | Knight et al. | |
| 7,958,066 B2 | 6/2011 | Pinckney et al. | |
| 8,032,480 B2 | 10/2011 | Pinckney et al. | |
| 9,280,777 B2 | 3/2016 | Bilicki et al. | |
| 10,275,502 B2 * | 4/2019 | Hubmann | G06F 8/36 |
| 10,614,414 B1 * | 4/2020 | Raymond | G06Q 10/087 |
| 2010/0125486 A1 | 5/2010 | Sinclair et al. | |
| 2010/0174949 A1 * | 7/2010 | Athey | G06F 11/0793 |
| | | | 714/39 |

(Continued)

FOREIGN PATENT DOCUMENTS

| | | | | |
|---|---|---|---|---|
| WO | WO-2014008386 A2 * | 1/2014 | | G05B 19/418 |
| WO | 2016047949 A1 | 3/2016 | | |

OTHER PUBLICATIONS

Tang, Christopher S., Robust strategies for mitigating supply chain disruptions, Published online 23, Jan. 2007, International Journal of Logistics (2006), Research and Applications 9:1, pp. 33-45 (Year: 2007).*

(Continued)

*Primary Examiner* — Dylan C White
(74) *Attorney, Agent, or Firm* — Stephanie L. Carusillo

(57) ABSTRACT

In an approach to generating advice for supply chain disruptions, one or more computer processors receive a query associated with a supply chain disruption. The one or more computer processors retrieve data corresponding to the supply chain disruption. Based on the retrieve data, the one or more computer processors determine one or more solutions to the supply chain disruption. The one or more computer processors display the one or more determined solutions. The one or more computer processors receive a selection of one of the one or more determined solutions. The one or more computer processors detect one or more patterns associated with the selected solution.

15 Claims, 6 Drawing Sheets

(56) References Cited

U.S. PATENT DOCUMENTS

| | | | |
|---|---|---|---|
| 2014/0278706 A1* | 9/2014 | Leidner | G06Q 10/06315 705/7.25 |
| 2016/0217406 A1* | 7/2016 | Najmi | G06Q 10/06315 |
| 2017/0017909 A1 | 1/2017 | Srinivasan | |
| 2017/0039500 A1 | 2/2017 | Leidner | |
| 2017/0228846 A1* | 8/2017 | Mohr | G06Q 10/1097 |
| 2017/0300852 A1 | 10/2017 | Glatfelter | |
| 2020/0035687 A1* | 1/2020 | Horiuchi | H01L 27/1104 |
| 2020/0387812 A1* | 12/2020 | Lewis | G06N 5/04 |
| 2021/0049532 A1* | 2/2021 | Smith | G06N 20/00 |
| 2021/0248447 A1* | 8/2021 | Rickard | G06N 3/0445 |

OTHER PUBLICATIONS

Chopra, S. and Sodhi, M., Reducing the risk of supply chain disruptions, 2014, MIT Sloan management review, 55(3), pp. 72-80. (Year: 2014).*

"How cognitive solutionswill change the future of Procurement and Supply Chain", Capgemini, Feb. 20, 2018, 5 pages, <https://www.capgemini.com/2018/02/how-cognitive-solutions-will-change-the-future-of-procurement-and-supply-chain/.

"The Enterra Supply Chain Intelligence System™", Supply Chains and Big Data | Artificial Intelligence and Big Data | Cognitive, 2018 © Enterra Solutions®, 3 pages, <https://www.enterrasolutions.com/the-enterra-supply-chain-intelligence-solution/.

Gaus et al., "Synchronizing the digital supply network", Using artificial intelligence for supply chain planning, May 22, 2018, Advanced Artificial Intelligence & Supply Chain Planning | Deloitte Insights, 11 pages, <https://www2.deloitte.com/insights/us/en/focus/industry-4-0/artificial-intelligence-supply-chain-planning.html.

Mell et al., "The NIST Definition of Cloud Computing", NIST National Institute of Standards and Technology U.S. Department of Commerce, Special Publication 800-145, Sep. 2011, 7 pages.

* cited by examiner

SUPPLY CHAIN DISRUPTION ADVISOR

BACKGROUND OF THE INVENTION

The present invention relates generally to the field of data analytics, and more particularly to generating advice for supply chain disruptions.

In business and finance, supply chain is a system of organizations, people, activities, information, and resources involved in moving a product or service from supplier to customer. Supply chain activities involve the transformation of natural resources, raw materials, and components into a finished product that is delivered to the end customer.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction. Machine learning explores the study and construction of algorithms that can learn from and make predictions on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results and to uncover hidden insights through learning from historical relationships and trends in the data.

SUMMARY

Embodiments of the present invention disclose a method, a computer program product, and a system for generating advice for supply chain disruptions. The method may include one or more computer processors receiving a query associated with a supply chain disruption. The one or more computer processors retrieve data corresponding to the supply chain disruption. Based on the retrieve data, the one or more computer processors determine one or more solutions to the supply chain disruption. The one or more computer processors display the one or more determined solutions. The one or more computer processors receive a selection of one of the one or more determined solutions. The one or more computer processors detect one or more patterns associated with the selected solution.

DETAILED DESCRIPTION

Supply chain is the organization within an enterprise responsible for planning, and often procuring, raw materials, components, and parts needed to manufacture a product. A supply chain disruption can include part shortages due to part failure, quality issues, changes, and other shortages. Part shortages may be shortages to customer orders as well as shortages when a component supplier's commits do not support the part forecast. The amount, and complexity, of data a supply chain needs to digest is growing. For complex products, supply chain practitioners may not be able to proactively analyze every part number or potential disruption for resolution within a reasonable amount of time. Embodiments of the present invention recognize that efficiency may be gained by employing a cognitive tool that can quickly analyze all available data and suggest one or more solutions to a supply chain disruption, thereby optimizing costs, while minimizing length of time to resolution, and managing risk. Embodiments of the present invention also recognize that in order to gain the trust of a supply chain practitioner, it is important to provide supporting details to explain how a solution was derived, enabling the user to make an informed decision. Embodiments of the present invention also recognize that ranking the solutions based on a pre-defined set of rules enables the user to easily choose the best solution. Implementation of embodiments of the invention may take a variety of forms, and exemplary implementation details are discussed subsequently with reference to the Figures.

Figure 1:
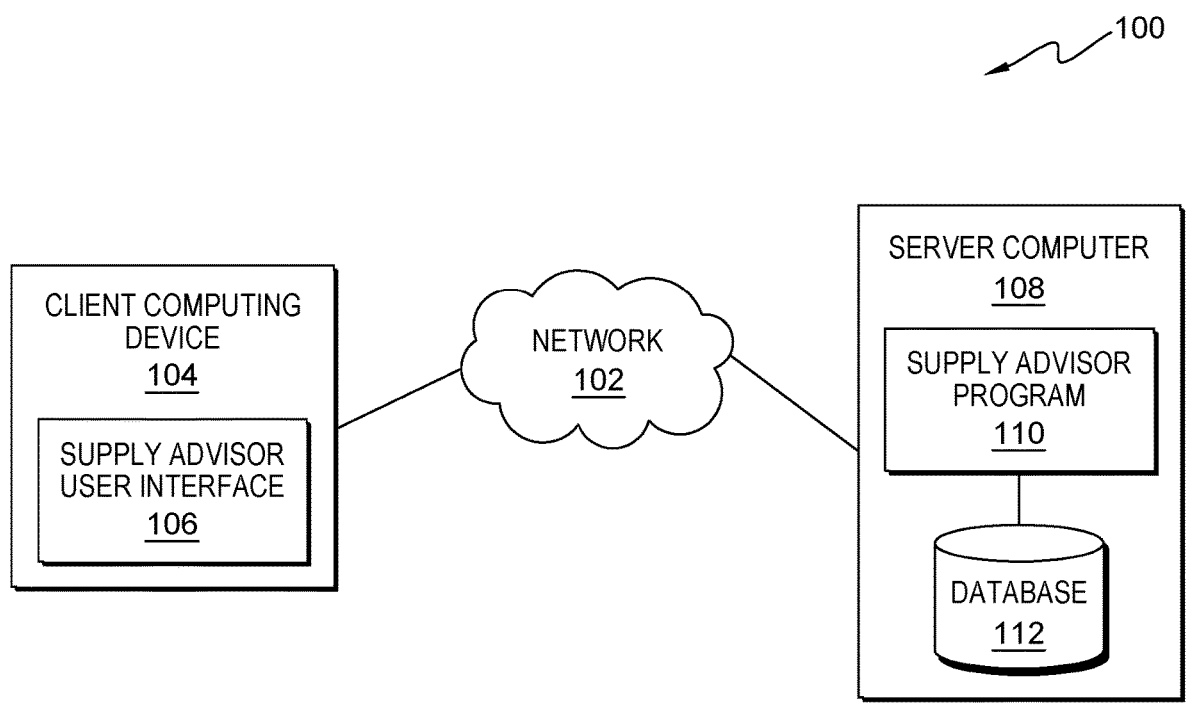
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between client computing device 104 and server computer 108, and other computing devices (not shown) within distributed data processing environment 100.

Client computing device 104 can be a laptop computer, a tablet computer, a smart phone, smart watch, a smart speaker, or any programmable electronic device capable of communicating with various components and devices within distributed data processing environment 100, via network 102. Client computing device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client computing device 104 represents one or more programmable electronic devices or combination of programmable electronic devices capable of executing machine readable program instructions and communicating with other computing devices (not shown) within distributed data processing environment 100 via a network, such as network 102. In one embodiment, client computing device 104 represents one or more devices associated with a user. Client computing device 104 includes an instance of supply advisor user interface 106.

Supply advisor user interface 106 enables a user to make requests of or issue commands to client computing device 104 and receive information and instructions in response. In one embodiment, a user of client computing device 104 accesses supply advisor user interface 106 via voice commands in natural language. In one embodiment, supply advisor user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, supply advisor user interface 106 may also be mobile application software. In an example, mobile application software, or an "app," is a computer program designed to run on smart phones, tablet computers and other mobile devices. Supply advisor user interface 106 enables a user of client computing device 104 to interact with supply advisor program 110.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes supply advisor program 110 and database 112. Server computer 108 may include internal and external hardware components, as depicted and described in further detail with respect to FIG. 4.

Supply advisor program 110 is a natural language based cognitive tool for responding to a query from a user regarding a supply chain disruption, such as a part shortage, with a ranked list of recommended solutions. Supply advisor program 110 receives training data, including a set of pre-defined rules, from one or more subject matter experts. Once, trained, supply advisor program 110 receives a query from a user regarding a supply chain disruption. Supply advisor program 110 retrieves all currently available data corresponding to one or more part numbers included in the query. Supply advisor program 110, using analytics based on pre-defined rules, as well as machine learning, determines one or more solutions to the disruption. Supply advisor program 110 ranks the solutions, if there are more than one. Supply advisor program 110 displays "visuals," or snapshots, of the data used to determine the solution, as well as the ranked list of solutions. Supply advisor program 110 determines whether the user would like to see the supporting details for the solutions, and, if so, then supply advisor program 110 displays the supporting details. Supply advisor program 110 receives a selection of a solution from the user. In addition, supply advisor program 110 receives feedback on whether or not the solution was successful and adds the feedback into the training data in order to further refine future analyses. Supply advisor program 110 is depicted and described in further detail with respect to FIG. 2.

Database 112 is a repository for data used by supply advisor program 110. In the depicted embodiment, database 112 resides on server computer 108. In another embodiment, database 112 may reside on client computing device 104 or elsewhere within distributed data processing environment 100 provided supply advisor program 110 has access to database 112. A database is an organized collection of data. Database 112 can be implemented with any type of storage device capable of storing data and configuration files that can be accessed and utilized by supply advisor program 110, such as a database server, a hard disk drive, or a flash memory. Database 112 stores data used by supply advisor program 110, such as customer orders, inventory, forecasts, order commitments, historical solutions to disruptions, selected solutions, solutions that were not selected, feedback, reports, and the like.

Figure 2:
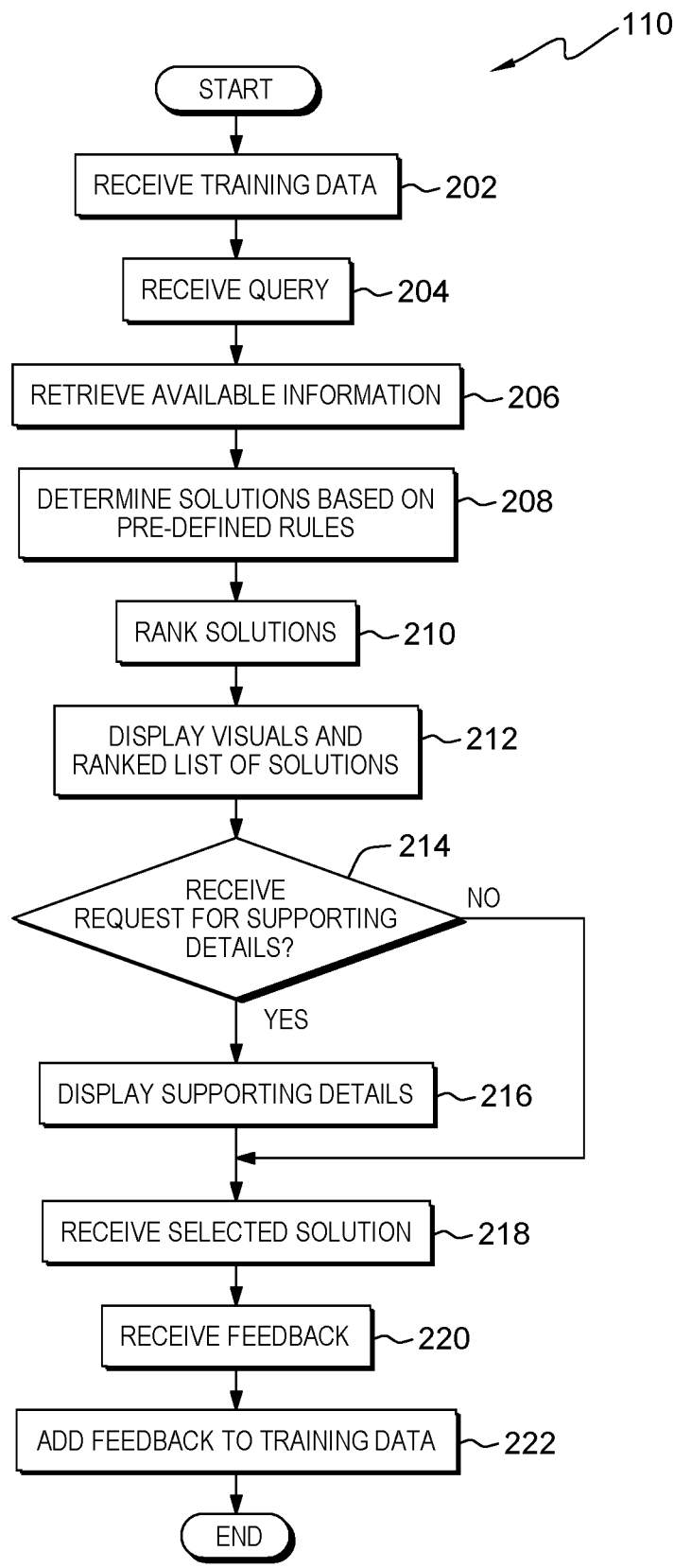
FIG. 2 is a flowchart depicting operational steps of a supply advisor program, on a server computer within the distributed data processing environment of FIG. 1, for determining solutions to a supply shortage, in accordance with an embodiment of the present invention.

FIG. 2 is a flowchart depicting operational steps of supply advisor program 110, on server computer 108 within distributed data processing environment 100 of FIG. 1, for determining solutions to a supply shortage, in accordance with an embodiment of the present invention.

Supply advisor program 110 receives training data (step 202). As a cognitive tool, supply advisor program 110 receives data which trains supply advisor program 110 to resolve supply chain disruptions. Subject matter experts (SMEs) define and document optimal steps and reasoning for determining a solution to a supply chain shortage which includes a plurality of pre-defined rules, and supply advisor program 110 receives the information from the SMEs. In addition to the rules, supply advisor program 110 may receive data associated with various parts, such as supply chain transactional data, part attributes, and historical issues. Supply chain transactional data may include, but is not limited to, a product bill of materials (BOM), current stock, inventory, orders, shipments, status of a manufacturing build, forecast, manufacturing resource planning (MRP) demand, supplier forecast, and supplier commits. Part attributes may include, but are not limited to, supplier name, commodity, lead time, logistics, and minimum order quantity (MOQ). Historical issues may include, but are not limited to, quality issues, cost issues, availability issues, and shortages. In one embodiment, at least a portion of the training data is stored in database 112.

Supply advisor program 110 receives a query (step 204). Supply advisor program 110 receives a query from a user regarding a current or potential shortage of a manufacturing component, via supply advisor user interface 106. In one embodiment, supply advisor program 110 uses one or more natural language processing (NLP) techniques to receive the query and determine what the user is asking. For example, if the user inputs a query such as "what should I do if we run out of PN 84F5691?" then supply advisor program 110 determines the query corresponds to a potential or upcoming shortage of part number 84F5691.

Supply advisor program 110 retrieves available information (step 206). Supply advisor program 110 gathers all available information related to the specific disruption noted in the received query. The available information may include, but is not limited to, customer orders, parts inventory, supply forecasts, supplier commits, etc. In one embodiment, the information includes at least a portion of the data included in the training data, as described with respect to step 202. In one embodiment, supply advisor program 110 retrieves the information from database 112. In another embodiment, supply advisor program 110 retrieves the information from one or more real time execution systems supporting the supply chain (not shown in FIG. 1), for example, MRP tools, and other real time execution systems, as would be recognized by one skilled in the art. In one embodiment, supply advisor program 110 systematically monitors part supply levels relative to changing demand on a pre-defined time interval, for example, everyday at 5:00 pm, such that supply advisor program 110 does not retrieve some or all of the available data in response to receiving a query because supply advisor program 110 has already accessed the most recent data.

Supply advisor program 110 determines solutions based on pre-defined rules (step 208). SMEs pre-define the steps to take and the order in which to take them when responding to a supply chain disruption, such as a component shortage. For example, the steps may be (1) check parts supply at this location and other locations; (2) use primary part number first, then expand search to alternate part numbers if necessary; (3) work with supplier on alternate means of supply, such as expediting, rework, etc.; (4) investigate usage of field replaceable units (FRUs), returned parts, etc.; and (5) determine whether customer will accept an altered order, i.e., shipping short, alternate supplier, quality off-spec, etc. In one embodiment, the set of rules may be referred to as a playbook. The rules may also include thresholds for cost or for time. For example, the rules may stipulate that an alternate part number is only acceptable if the cost is less than 10% higher than the primary part number. In another example, the rules may state that a part number from another location is acceptable as long as transit time is less than five business days. Supply advisor program 110 analyzes the available data with respect to the pre-defined rules and determines one or more solutions to the disruption. In an embodiment, in addition to the pre-defined rules, supply advisor program 110 may use information learned from historical issues to determine solutions. For example, if a particular supplier has repeatedly delivered components late, supply advisor program 110 can choose a different supplier as a candidate for the problem resolution. In another embodiment, supply advisor program 110 may also use information such as specific part attributes, for example, commodity type, lead time, etc., for determining a solution. In a further embodiment, supply advisor program 110 may also use external industry insights, for example, commodity pricing, supply increases or decreases, etc., for determining a solution. In an embodiment, supply advisor program 110 timestamps the determined solutions and stores the solutions in association with the timestamp in database 112. As a solution may be time dependent, it is important to preserve the time and date of when supply advisor program 110 determined the solution. In the embodiment, supply advisor program 110 may include an expiration time and/or date on a solution so that if a user chooses the solution after the solution expires, then supply advisor program 110 alerts the user that the solution is no longer valid.

Supply advisor program 110 ranks the solutions (step 210). In an embodiment where supply advisor program 110 determines more than one solution, supply advisor program 110 ranks the solutions to enable the user to see the various solutions in a preferred order. In one embodiment, supply advisor program 110 ranks the solutions by turnaround time, i.e., supply advisor program 110 ranks the fastest solution number one. In another embodiment, supply advisor program 110 ranks the solutions by cost, i.e., supply advisor program 110 ranks the lowest cost solution number one. In one embodiment, the user selects the ranking criteria. In another embodiment, the ranking criteria are included in the pre-defined rules. In an embodiment, supply advisor program 110 may have relative rankings with different criteria. For example, one solution may be the best for cost, while another solution is the best for time.

Figure 3:
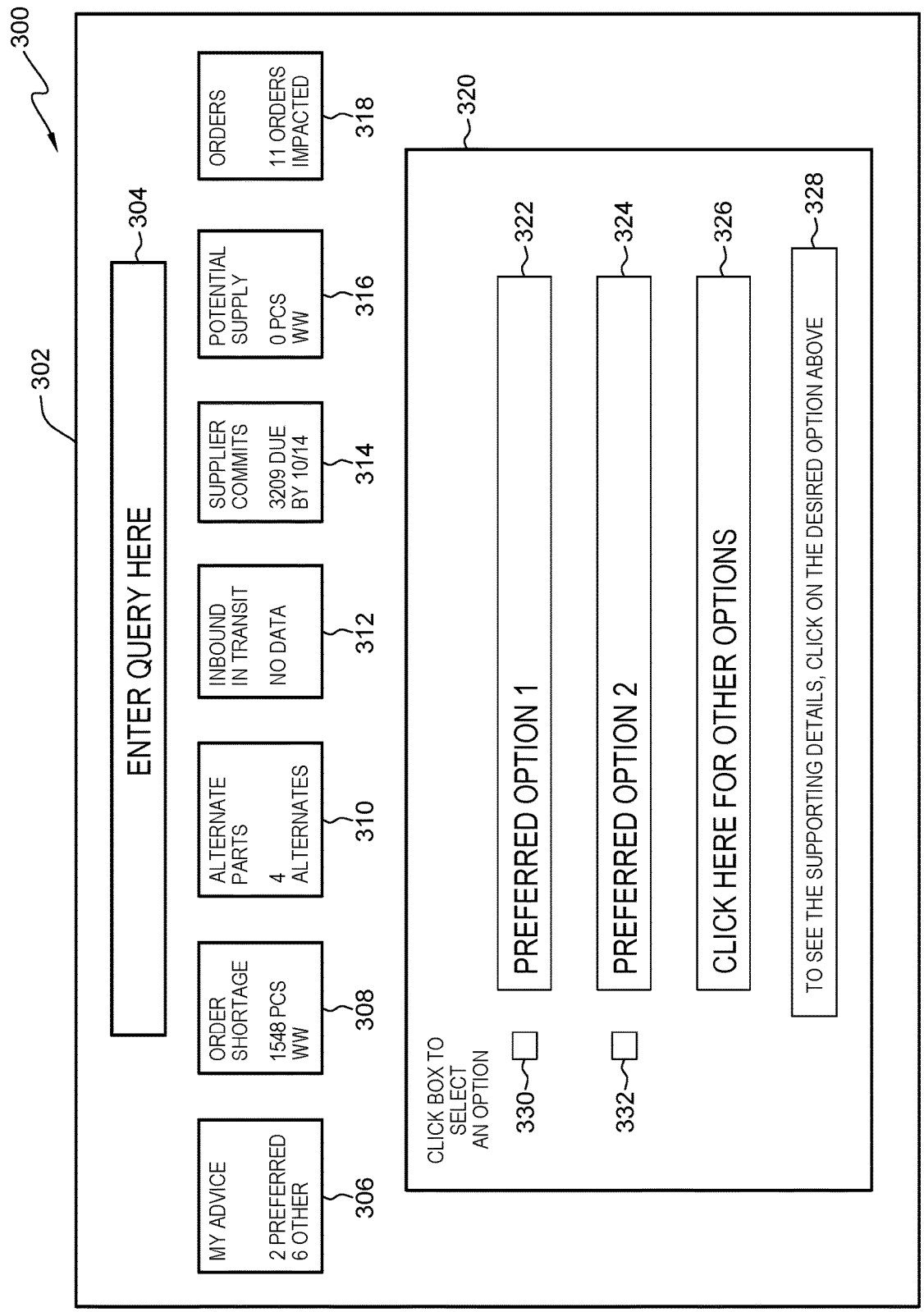
FIG. 3 illustrates an embodiment of a user interface of the supply advisor program, on a client computing device within the distributed data processing environment of FIG. 1, in accordance with an embodiment of the present invention.

Supply advisor program 110 displays visuals and the ranked list of solutions (step 212). As used herein, the term "visuals" may refer to any kind of visual information displayed via a graphical user interface, such as supply advisor user interface 106. In one embodiment, the visuals are displayed icons for which supply advisor program 110 generates associated data by combining, merging, associating, and netting the available data, enabling the user to have more insight to the status of the disruption than the user would have by just viewing raw data in tables, such as depicted in FIG. 3. The visuals integrate cross-domain data into decision support views for quick absorption and assessment, enabling faster and more accurate decisions. In addition to the visuals, or instead of the visuals, supply advisor program 110 displays a summary of the one or more determined solutions to the supply chain disruption. In an embodiment, supply advisor program 110 displays the visuals and/or the solutions such that they are interactive, i.e., the user can click on them or tap them and get additional information. In one embodiment, supply advisor program 110 displays the solutions in the order in which supply advisor program 110 ranked the solutions. In an embodiment, the ranking may be displayed adjacent to the solution. For example, the ranking displayed adjacent to a solution may say "best for cost" or "best for time." By including multiple determined solutions, supply advisor program 110 provides options for the user, enabling the user to include additional personal knowledge in choosing a solution. For example, a user may be aware of unique circumstances that will not allow one of the suggested solutions to work. In one embodiment, supply advisor program 110 only displays the highest-ranking solution. In one embodiment, supply advisor program 110 automatically generates a report that includes the ranked solutions and transmits the report to the user. Additional details regarding the display of visuals and solutions will be described in FIG. 3.

In one embodiment, supply advisor program 110 continually monitors the status of part numbers and anticipates when a shortage may occur. In the embodiment, supply advisor program 110 does not receive a query, but instead sends an alert to one or more users upon determination and ranking of one or more solutions, as described with respect to steps 206 through 210. In the embodiment, supply advisor program 110 predicts consumption of component parts via customer orders and compares the predicted consumption to the component forecast in order to advise users of upcoming shortages due to actual demand greater than forecast.

Supply advisor program 110 determines whether a request for supporting details is received (decision block 214). If a user wants to see the details that support a proposed solution, or the ranking of the solutions, then the user can request to see the supporting details, and supply advisor program 110 receives the request. In one embodiment, supply advisor program 110 receives the request when the user clicks on a displayed solution. In another embodiment, supply advisor program 110 may receive the request via natural language that the user enters in a request field or speaks into a microphone associated with client computing device 104 (not shown). Enabling the user to see the supporting details of the recommendation promotes trust in the recommendation, and therefore, adoption or "buy-in" of the solution. The user can see how the solution was determined, i.e., why supply advisor program 110 came up with the proposed solution, thus, providing training and knowledge to the user.

If supply advisor program 110 determines a request for supporting details is received ("yes" branch, decision block 214), then supply advisor program 110 displays the supporting details (step 216). Supply advisor program 110 displays a trail of evidence associated with a selected solution. In one embodiment, supply advisor program 110 displays one or more tables or graphs with data such as a worldwide analysis of quantities by part number and location, or a supplier forecast versus supplier commit for a particular part number. In another embodiment, supply advisor program 110 may display natural language, explaining how the analysis was done, i.e., the results of following the pre-defined rules. In a further embodiment, supply advisor program 110 may display a netted summary in addition to the supporting details. In one embodiment, supply advisor program 110 automatically generates a report that includes the ranked solutions with the associated supporting details and transmits the report to the user. Additional details regarding the display of supporting details will be described in FIG. 3.

If supply advisor program 110 determines a request for supporting details is not received ("no" branch, decision block 214), or responsive to displaying supporting details, supply advisor program 110 receives the selected solution (step 218). After the user has reviewed the available solutions, and, if requested, the supporting details, the user chooses which recommended actions to take in order to resolve the disruption, via supply advisor user interface 106, and supply advisor program 110 receives the selection. In one embodiment, supply advisor program 110 receives a selection when the user checks a selection box displayed in supply advisor user interface 106. In another embodiment, supply advisor program 110 may receive a selection when the user right clicks on the desired solution and chooses "select" from a popup box, via supply advisor user interface 106. In a further embodiment, supply advisor program 110 may receive a selection when the user speaks the selection into a microphone associated with client computing device 104 (not shown), and supply advisor program 110 analyzes the speech using one or more natural language processing techniques.

In one embodiment, supply advisor program 110 generates a confidence score for each recommended solution. The confidence score may be based on historical successful solutions, the retrieved available data, previous feedback, and any other data available. In the embodiment, if the confidence score is greater than a pre-defined threshold, then supply advisor program 110 automatically performs the solution. If more than one solution has a confidence score greater than the pre-defined threshold, then supply advisor program 110 may automatically perform the highest-ranking solution of those solutions with confidence scores above the threshold. If none of the solutions has a confidence score greater than the threshold, then supply advisor program 110 can display the confidence scores in addition to the rankings and receive a selection from the user. In one embodiment, supply advisor program 110 displays the confidence score for each displayed solution such that the user can review the confidence scores before selecting a solution.

Supply advisor program 110 receives feedback (step 220). In one embodiment, as soon as supply advisor program 110 receives the selected solution, supply advisor program 110 provides a screen, via supply advisor user interface 106, for the user to input feedback associated with the selection. In another embodiment, supply advisor program 110 may wait for a pre-defined duration of time to pass before prompting the user for feedback. In a further embodiment, supply advisor program 110 may receive feedback once the user has completed taking actions and goes back to supply advisor user interface 106 to provide feedback. Feedback may include one or more reasons why the user selected a particular solution, one or more reasons why the user did not select one or more of the solutions, one or more reasons why the user did not select any of the solutions, results of taking the actions in the selected solution, which criteria are important, or not important, to the user, which criteria a more important or less important to a particular part or component, and any additional information an SME might suggest in order to improve the function of supply advisor program 110. In one embodiment, supply advisor program 110 receives feedback when the user clicks on a box labelled "feedback" displayed in supply advisor user interface 106 and writes in comments. In another embodiment, supply advisor program 110 may receive feedback when the user right clicks on the desired solution and chooses "feedback" from a popup box, via supply advisor user interface 106 and writes in comments. In a further embodiment, supply advisor program 110 may receive feedback when the user speaks the feedback into a microphone associated with client computing device 104 (not shown), and supply advisor program 110 analyzes the speech using one or more natural language processing techniques. In yet another embodiment, supply advisor program 110 may receive feedback when the user clicks on a "thumbs up" or "thumbs down" icon displayed via supply advisor user interface 106, in order to indicate whether or not the solution worked. In another embodiment, supply advisor program 110 may receive feedback when the user clicks on a number of star icons displayed via supply advisor user interface 106, where, for example, five stars is a good rating and zero stars is a bad rating.

Supply advisor program 110 adds feedback to training data (step 222). Supply advisor program 110 adds the received feedback to the training data in database 112. By saving feedback, for example, regarding which solutions worked and which did not, supply advisor program 110 can improve future recommendations, via machine learning. For example, if supply advisor program 110 recommended buying an alternate part number, but the feedback for that solution was that the cost of the alternate part number was too high, then supply advisor program 110 learns to take cost into consideration when determining and ranking solutions. In one embodiment, supply advisor program 110 can detect patterns, via cognitive analytics, for one or more users regarding the selected solution and feedback, thereby considering specific user demographics and behaviors. For example, if a user chooses the lowest cost solution in a pre-defined threshold number of queries, then supply advisor program 110 can determine that the next time the user submits a query, supply advisor program 110 will rank the lowest cost solution at the top of the list. In another example, supply advisor program 110 may detect that users in Raleigh prefer to source parts from the east coast of the United States while users in San Jose prefer to source parts from the west coast of the United States. Supply advisor program 110 can use the learned pattern information to improve the ranking of recommended solutions in the future. In the embodiment, supply advisor program 110 adds the detected patterns to the training data. In one embodiment, supply advisor program 110 can modify the pre-defined rules based on machine learning and pattern detection of historical trends and developed insights to better adapt the rules based on particular parts, suppliers, processes, etc.

In one embodiment, a user can use supply advisor program 110 to perform what-if simulations. Examples of scenarios where a what-if simulation may be valuable include, but are not limited to, a sales representative considering a sale on select machine types or machine type models, a potential increase or decrease of supply on a commodity type, and a revenue impact assessment of shifting volumes up or down for product families or machine types. Supply advisor program 110 can provide advice on the supply implications of an increase or decrease in volume for those machine types, or a commodity of a proposed quantity for a certain time period. Supply advisor program 110 can factor in the increase or decrease in component parts needed against the lead time and other demand to recommend actions to prevent shortages or liability impacts. Each simulation has a series of probabilities of events on any given path. Supply advisor program 110 develops a neural network wherein one or many nodes can influence other node(s) resulting in a complex, real-world environment.

FIG. 3 illustrates embodiment 300 of supply advisor user interface 106 of supply advisor program 110, on client computing device 104 within distributed data processing environment 100 of FIG. 1, in accordance with an embodiment of the present invention.

Box 302 is an example of supply advisor user interface 106 as displayed on a screen associated with client computing device 104. Supply advisor user interface 106 includes query box 304, visuals boxes 306 through 318, and results box 320. Query box is an area where the user can input text describing a query. For example, the user may type "what should I do if we run out of PN 84F5691?" as described with respect to step 204. Visuals boxes 306 through 318 are examples of snapshots of some of the data retrieved by supply advisor program 110, as discussed with respect to step 206. In the embodiment, the visuals icons include text to describe the data in addition to the data itself. For example, visuals box 308 is described as "order shortage" and the associated data is 1548 pieces worldwide, i.e., the quantity of parts in the shortage. In one embodiment, the visuals each represent a key step in the "playbook," i.e., the steps in the logic used to determine a solution. Although there are seven visuals shown in FIG. 3, FIG. 3 is only an example and does not imply any limitations to the number of visuals which supply advisor program 110 can display.

Results box 320 includes preferred option boxes 322 and 324, other options box 326, supporting details box 328, and selection boxes 330 and 332. Although there are two preferred options shown in FIG. 3, FIG. 3 is only an example and does not imply any limitations to the number of preferred options which supply advisor program 110 can determine. Preferred option box 322 displays the option ranked number one while preferred option box 324 displays the option ranked number two, as discussed with respect to steps 210 and 212. Once supply advisor program 110 determines and ranks one or more solutions, supply advisor program 110 displays, via supply advisor user interface 106, recommended actions in preferred option boxes 322 and 324. If supply advisor program 110 determines other options, not considered preferred, then the user can click other options box 326 to view the additional recommendations. If the user wants to view the supporting details of a recommended solution, in order to understand how supply advisor program 110 concluded the solution and associated ranking, then, as described in supporting details box 328, the user can click on the desired option and supply advisor program 110 displays the supporting details for the solution via supply advisor user interface 106. To select an option, the user clicks on the selection box associated with the option the user wants to select, i.e., selection box 330 or selection box 332. In an embodiment where the user wants to select one of the lower ranked options, not displayed in option box 320, after clicking other option box 326, selection boxes are displayed associated with the additional options such that the user can select one of the additional options. In an embodiment, once the user selects a solution, supply advisor program 110 displays a feedback screen, via supply advisor user interface 106, as described with respect to step 220.

Figure 4:
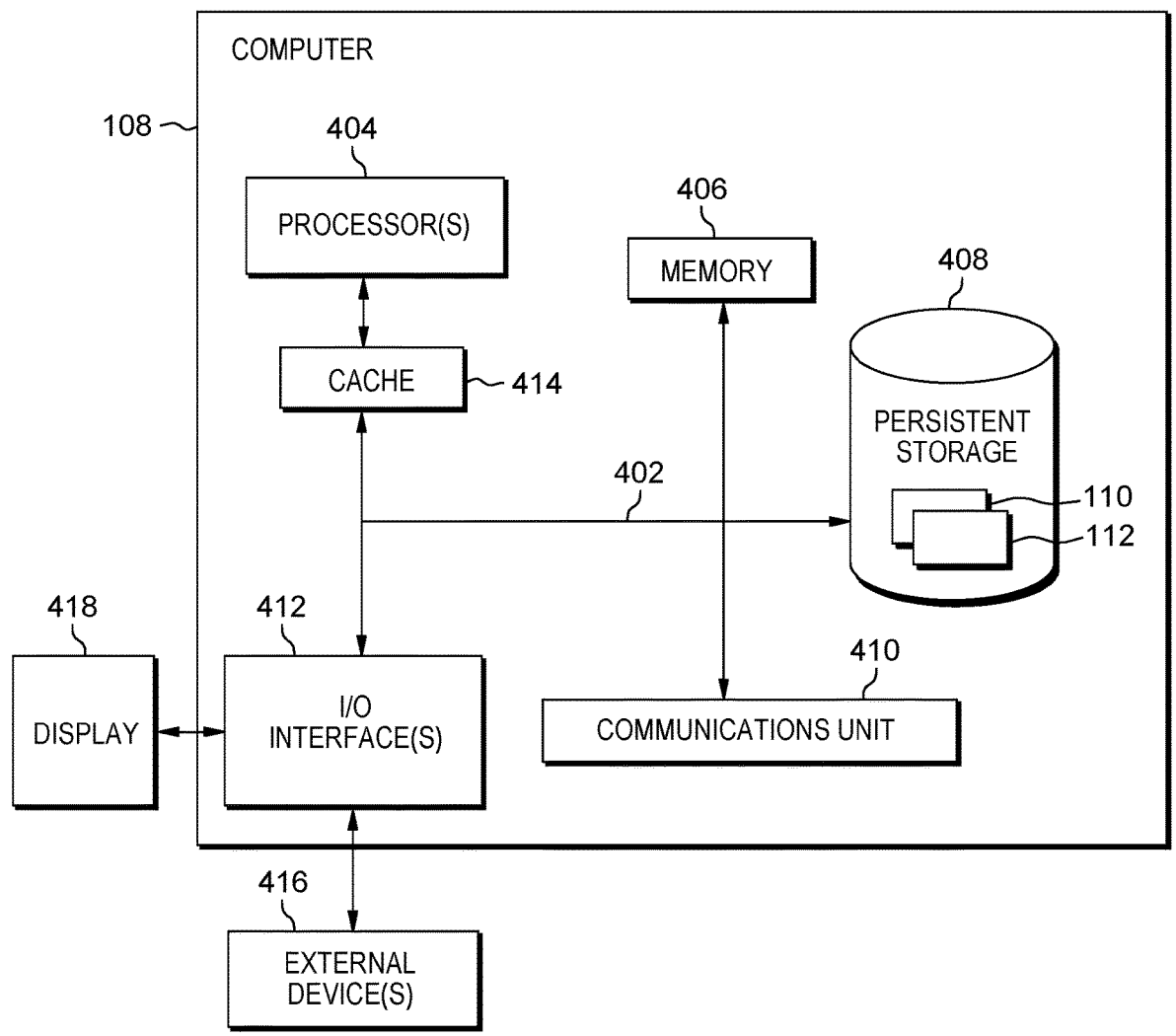
FIG. 4 depicts a block diagram of components of the server computer executing the supply advisor program within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., supply advisor program 110 and database 112, are stored in persistent storage 408 for execution and/or access by one or more of the respective processor(s) 404 of server computer 108 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. Supply advisor program 110, database 112, and other programs and data used for implementation of the present invention, may be downloaded to persistent storage 408 of server computer 108 through communications unit 410.

I/O interface(s) 412 allows for input and output of data with other devices that may be connected to server computer 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., supply advisor program 110 and database 112 on server computer 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
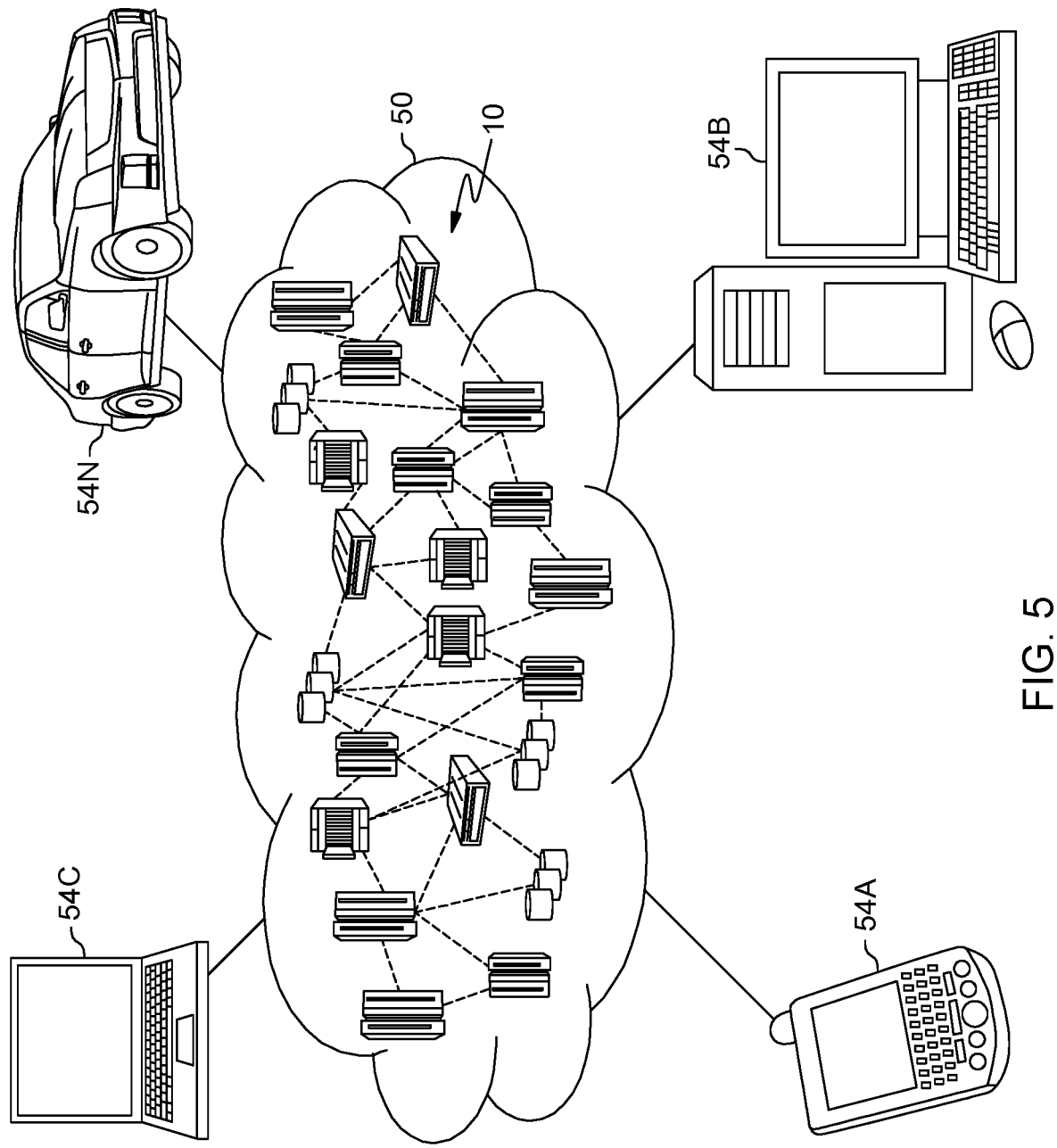
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
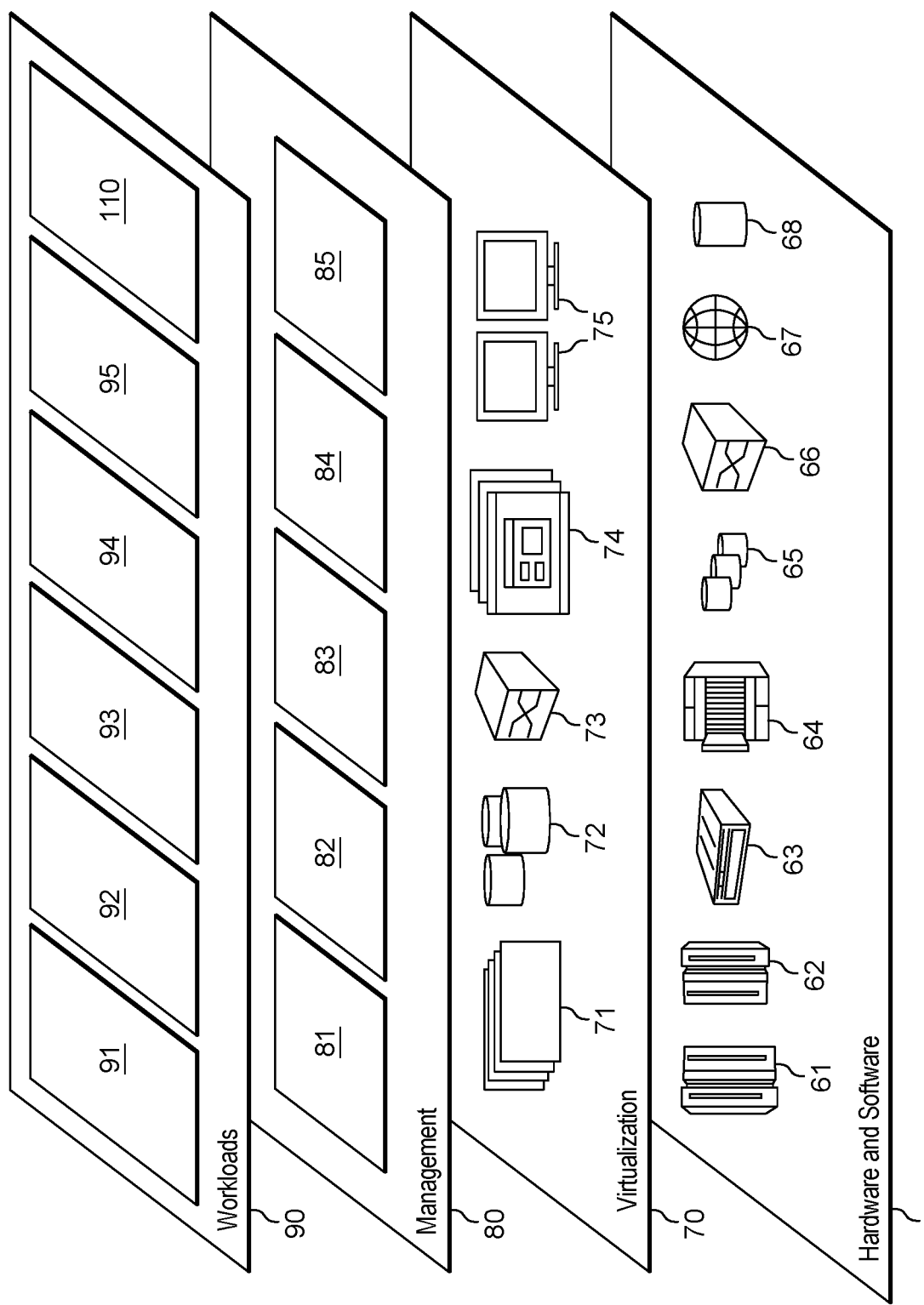
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and supply advisor program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, training data, wherein the training data includes one or more pre-defined rules associated with determining one or more solutions to a supply chain disruption;
   performing, by the one or more computer processors, a first training of a cognitive tool with the received training data;
   receiving, by the one or more computer processors, a query associated with the supply chain disruption;
   retrieving, by the one or more computer processors, data corresponding to the supply chain disruption, wherein the data corresponding to the supply chain disruption includes information learned by the cognitive tool from one or more historical issues;
   based on the retrieved data, determining, by the one or more computer processors, one or more solutions to the supply chain disruption using the cognitive tool;
   generating, by one or more computer processors, a confidence score for each of the one or more solutions;
   determining, by one or more computer processors, the confidence score of a first solution of the one or more solutions exceeds a pre-defined threshold value;
   responsive to determining the first solution exceeds the pre-defined threshold value, automatically performing, by one or more computer processors, the first solution;
   detecting, by the one or more computer processors, via cognitive analytics using the cognitive tool, one or more patterns associated with the first solution;
   receiving, by the one or more computer processors, feedback associated with the one or more solutions from a user;
   updating, by the one or more computer processors, the received training data with the received feedback and the one or more detected patterns; and
   performing, by one or more computer processors, a second training of the cognitive tool with the updated training data to refine a future analysis.

2. The method of claim 1, wherein the training data is selected from the group consisting of: supply chain transactional data, a product bill of materials, a current stock, an inventory, an order, a shipment, a status of a manufacturing build, a forecast, a manufacturing resource planning demand, a supplier forecast, a supplier commit, a part attribute, a supplier name, a commodity, a lead time, a logistic, a minimum order quantity, an historical issue, a quality issue, a cost issue, an availability issue, a shortage, and feedback on a previous disruption solution.

3. The method of claim 1, further comprising:
receiving, by the one or more computer processors, a request for one or more supporting details for the one or more solutions to the supply chain disruption; and
displaying, by the one or more computer processors, the one or more supporting details.

4. The method of claim 1, further comprising:
generating, by the one or more computer processors, data associated with one or more visual icons from the retrieved data; and
displaying, by the one or more computer processors, the one or more visual icons with the associated generated data.

5. The method of claim 1, wherein the supply chain disruption is selected from the group consisting of: a part shortage due to part failure, a part shortage due to one or more quality issues, a part shortage due to one or more changes, and a part shortage due to one or more other shortages.

6. The method of claim 1, wherein the retrieved data is selected from the group consisting of: a customer order, a part inventory, a supply forecast, and a supplier commit.

7. The method of claim 1, further comprising:
responsive to determining the confidence score does not exceed the pre-defined threshold value, displaying, by the one or more computer processors, the one or more solutions each with a selection box in a user interface to a user enabling the user to select one of the one or more determined solutions; and
receiving, by the one or more computer processors, a selection of one of the one or more determined solutions from the user based on which selection box the user selected.

8. A computer program product comprising:
one or more computer readable storage devices and program instructions stored on the one or more computer readable storage devices, the stored program instructions comprising:
program instructions to receive training data, wherein the training data includes one or more pre-defined rules associated with determining one or more solutions to a supply chain disruption;
program instructions to perform a first training of a cognitive tool with the received training data;
program instructions to receive a query associated with the supply chain disruption;
program instructions to retrieve data corresponding to the supply chain disruption wherein the data corresponding to the supply chain disruption includes information learned by the cognitive tool from one or more historical issues;
based on the retrieved data, program instructions to determine the one or more solutions to the supply chain disruption using the cognitive tool;
program instructions to generate a confidence score for each of the one or more solutions;
program instructions to determine the confidence score of a first solution of the one or more solutions exceeds a pre-defined threshold value;
responsive to determining the first solution exceeds the pre-defined threshold value, program instructions to automatically perform the first solution;
program instructions to detect, via cognitive analytics using the cognitive tool, one or more patterns associated with the selected solution;
program instructions to receive feedback associated with the one or more solutions from a user;
program instructions to update the received training data with the received feedback and the one or more detected patterns; and
program instructions to perform a second training of the cognitive tool with the updated training data to refine a future analysis.

9. The computer program product of claim 8, wherein the training data is selected from the group consisting of: supply chain transactional data, a product bill of materials, a current stock, an inventory, an order, a shipment, a status of a manufacturing build, a forecast, a manufacturing resource planning demand, a supplier forecast, a supplier commit, a part attribute, a supplier name, a commodity, a lead time, a logistic, a minimum order quantity, an historical issue, a quality issue, a cost issue, an availability issue, a shortage, and feedback on a previous disruption solution.

10. The computer program product of claim 8, the stored program instructions further comprising:
program instructions to receive a request for one or more supporting details for the one or more solutions to the supply chain disruption; and
program instructions to display the one or more supporting details.

11. The computer program product of claim 8, the stored program instructions further comprising:
program instructions to generate data associated with one or more visual icons from the retrieved data; and
program instructions to display the one or more visual icons with the associated generated data.

12. A computer system for generating advice for supply chain disruptions, the computer system comprising:
one or more computer processors;
one or more computer readable storage devices;
program instructions stored on the one or more computer readable storage devices for execution by at least one of the one or more computer processors, the stored program instructions comprising:
program instructions to receive training data, wherein the training data includes one or more pre-defined rules associated with determining one or more solutions to a supply chain disruption;
program instructions to perform a first training of a cognitive tool with the received training data;
program instructions to receive a query associated with the supply chain disruption;
program instructions to retrieve data corresponding to the supply chain disruption wherein the data corresponding to the supply chain disruption includes information learned by the cognitive tool from one or more historical issues;
based on the retrieved data, program instructions to determine the one or more solutions to the supply chain disruption using the cognitive tool;
program instructions to generate a confidence score for each of the one or more solutions;
program instructions to determine the confidence score of a first solution of the one or more solutions exceeds a pre-defined threshold value;

responsive to determining the first solution exceeds the pre-defined threshold value, program instructions to automatically perform the first solution;

program instructions to detect, via cognitive analytics using the cognitive tool, one or more patterns associated with the selected solution;

program instructions to receive feedback associated with the one or more solutions from a user;

program instructions to update the received training data with the received feedback and the one or more detected patterns; and program instructions to perform a second training of the cognitive tool with the updated training data to refine a future analysis.

13. The computer system of claim 12, wherein the training data is selected from the group consisting of: supply chain transactional data, a product bill of materials, a current stock, an inventory, an order, a shipment, a status of a manufacturing build, a forecast, a manufacturing resource planning demand, a supplier forecast, a supplier commit, a part attribute, a supplier name, a commodity, a lead time, a logistic, a minimum order quantity, an historical issue, a quality issue, a cost issue, an availability issue, a shortage, and feedback on a previous disruption solution.

14. The computer system of claim 12, the stored program instructions further comprising:

program instructions to receive a request for one or more supporting details for the one or more solutions to the supply chain disruption; and program instructions to display the one or more supporting details.

15. The computer system of claim 12, the stored program instructions further comprising:

program instructions to generate data associated with one or more visual icons from the retrieved data; and program instructions to display the one or more visual icons with the associated generated data.

* * * * *